US008611864B2

(12) United States Patent
Hali

(10) Patent No.: US 8,611,864 B2
(45) Date of Patent: Dec. 17, 2013

(54) CALL TERMINATION TO COMMUNICATE A STORED MESSAGE

(75) Inventor: Kapil Hali, Andhra Pradesh (IN)

(73) Assignee: Nvidia Corporation, Santa Clara, CA (US)

( * ) Notice: Subject to any disclaimer, the term of this patent is extended or adjusted under 35 U.S.C. 154(b) by 461 days.

(21) Appl. No.: 12/273,570

(22) Filed: Nov. 19, 2008

(65) Prior Publication Data

US 2010/0124908 A1    May 20, 2010

(51) Int. Cl.
*H04M 1/725*    (2006.01)

(52) U.S. Cl.
USPC ............... 455/412.2; 455/412.1; 455/413; 455/414.1; 455/415; 455/418

(58) Field of Classification Search
USPC .......... 455/405, 417, 466, 412.1, 412.2, 413, 455/414.1, 415, 418, 420
See application file for complete search history.

(56) References Cited

U.S. PATENT DOCUMENTS

| 5,566,182 | A | * | 10/1996 | Gantner et al. ............. 370/524 |
| 6,154,646 | A | * | 11/2000 | Tran et al. .................. 455/417 |
| 7,027,579 | B1 | * | 4/2006 | McDonald et al. ...... 379/211.01 |
| 7,177,631 | B2 | * | 2/2007 | Amin ......................... 455/415 |
| 7,636,431 | B2 | * | 12/2009 | Williams et al. ........ 379/221.13 |
| 2004/0120494 | A1 | * | 6/2004 | Jiang et al. ............. 379/210.01 |
| 2004/0137923 | A1 | * | 7/2004 | Lang ........................ 455/466 |

* cited by examiner

*Primary Examiner* — Manpreet Matharu

(74) *Attorney, Agent, or Firm* — Raj Abhyanker, P.C.

(57) ABSTRACT

A method, apparatus, and system of using call termination to communicate a message are disclosed. In one embodiment, a system of a telecommunications network includes a mobile station associated with the telecommunications network, a switching module of the telecommunications network to establish a call between a communication device and the mobile station, a call termination module of the mobile station to determine if the mobile station is in a call termination mode and to communicate a communication protocol to the switching module to cause the switching module to terminate the call if the mobile station is in the call termination mode, and a message module of the telecommunications network to communicate a message to the communication device.

20 Claims, 6 Drawing Sheets

CALL TERMINATION TO COMMUNICATE A STORED MESSAGE

FIELD OF TECHNOLOGY

This disclosure relates generally to a communication system and method, a technical field of software and/or hardware technology and, in one example embodiment, a method, apparatus, and system of call termination to communicate a message.

BACKGROUND

A calling party may use a communicating device to call another party with a mobile station. The other party may have a set of options regarding how to respond to a call. For example, the other party may answer the call, may not answer the call and/or may terminate the call. If the other party answers the call, a connection through a wireless telephone network may occur. The other party may incur a charge for use of the wireless telephone network. Also, if the other party does not answer the call, another connection through the wireless telephone network may be established by a voice messaging service. Thus, the other party may incur another charge for use of the wireless telephone network.

SUMMARY

A method, apparatus, and system of call termination to communicate a message are disclosed. In one aspect, a system of a telecommunications network includes a mobile station associated with the telecommunications network, a switching module of the telecommunications network to establish a call between a communication device and the mobile station, a call termination module of the mobile station to determine if the mobile station is in a call termination mode and to communicate a communication protocol to the switching module to cause the switching module to terminate the call if the mobile station is in the call termination mode, and a message module of the telecommunications network to communicate a message to the communication device.

The communication device may further include a database module of the switching module to store the message. The communication device may also include a mode module of the mobile station to enable the mobile station to be placed in the call termination mode. The message module may generate a content of the message, store the message in the database module and also associate the message with the communication device. The switching module may be a mobile switching center (MSC) that is a service delivery node for a global system for mobile communications (GSM). The communication protocol may be an ISDN User Part (ISUP) protocol used to establish the call on a circuit switching network.

The communication protocol may be an ISUP protocol that may be used to establish the call on the circuit switching network. The ISUP protocol may be a release ISUP message with a specified code parameter communicated by the call termination module to the MSC. The communication device may further include a registration module of the call termination module to determine if the mobile station is registered with a call termination service and to permit the call termination module to terminate the call if the mobile station is registered with the call termination service. The mode module may contain a run-time module to place the mobile station in the call termination mode in run-time.

The communication device may also include a mode determination module of the call termination module to determine if the mobile station is in the call termination mode. In addition, the communication device may include a display module to render an indicator icon on a user interface of the mobile station to indicate that the mobile station is receiving the call from the communication device. The call may be terminated by performing a haptic gesture on the user interface of the mobile station and inputting an alphanumeric code into the mobile station. The communication device may also include a time module that may terminate the call after a specified period of time has elapsed from the time the call is detected by the mobile station. The call termination module may be in the switching module. The specified code parameter may be a release (REL) message.

In another aspect, a method of a telecommunications network includes determining if a mobile station is in a call termination mode, communicating a communication protocol to a switching module of the telecommunications network to cause the switching module to terminate a call if the mobile station is in a call termination mode, terminating the call, and communicating a message to a calling device after termination of the call.

In yet another aspect, a method of a telecommunications network includes configuring a terminator module of a called device to terminate a call, configuring the called device to communicate a specified communication protocol to a logic module of a mobile switching center (MSC) after the call has been terminated by the terminator module, and configuring the logic module of the MSC to communicate a message to a calling device that originated the call.

The method may include configuring a database module of the MSC to store the message. The method may also include configuring a caller identification module to associate a particular calling device with a specified message and to cause the logic module to communicate the specified message to the particular calling device. The caller identification module may cause the logic module to communicate a generic message to the calling device if no specified message has been associated with the calling device. The specified communication protocol may be an ISDN User Part (ISUP) protocol.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of call termination to communicate a message are disclosed. Although the present embodiments have been described with reference to specific example embodiments, it will be evident that various modifications and changes may be made to these embodiments without departing from the broader spirit and scope of the various embodiments.

Figure 1:
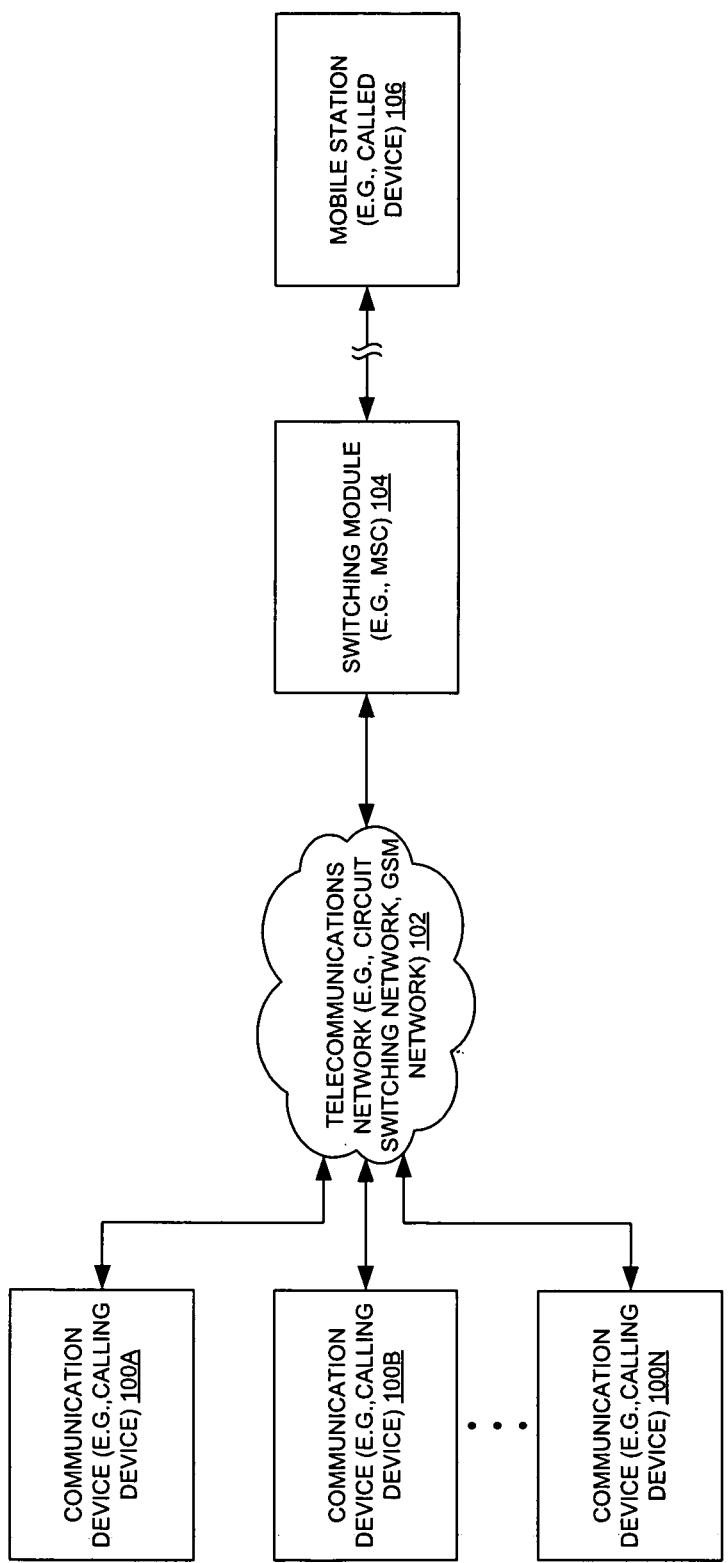
FIG. 1 is a system view of a telecommunications network illustrating the communication between a mobile station and a communication device, according to one embodiment.

FIG. 1 is a system view of a telecommunications network illustrating the communication between a mobile station and a communication device, according to one embodiment. Particularly, FIG. 1 illustrates a communication device 100A-N, a telecommunications network 102, a switching module 104, and a mobile station 106, according to one embodiment.

The communication device 100A-N may be a device (e.g., a mobile, a laptop, a personal digital assistant, a palm top, a landline telephone, etc.) to communicate a call to a mobile station (e.g., the mobile phone, etc.) through a telecommunications network (e.g., the circuit switching network, a GSM network, a GPRS network, etc). The telecommunications network 102 may be network (e.g., the computer network, the internet network, the public switched telephone network, the global Telex network, the aeronautical ACARS network, etc) of telecommunications links and nodes that may be arranged so that messages may be passed from one part of the network to another over multiple links and through various nodes.

Telecommunications network links (e.g., including their endpoints or "nodes") may in turn be built out of hierarchical transmission systems. The switching module 104 may be the mobile switching center which is the primary service delivery node for GSM, responsible for handling voice calls and SMS as well as other services (such as conference calls, FAX and circuit switched data). The switching module 104 (e.g., the MSC) may set up and release the end-to-end connection, handle mobility and hand-over requirements during the call. Furthermore, the switching module 104 may take care of charging and real time pre-paid account monitoring.

The mobile station 106 may be the mobile device (e.g., the cell phone device, the handheld device, the handheld computer, the palmtop, etc.) which is a pocket-sized computing device having a display screen (e.g., the display module 300 of FIG. 3) with touch input and/or a miniature keyboard. The mobile station 106 may be a mobile device capable of communicating through a network.

In an example embodiment, the communication device (e.g., calling device) 100A-N may communicate with the mobile station (e.g., called device) 106 through the telecommunications network (e.g., the circuit switching network, the GSM network) 102. The communication device 100A-N may be any device that communicates data (digital and/or analog) over a network (e.g. a mobile phone, a telephone, a computer using a software program that allows users to make a call over a network). The switching module (e.g., the MSC) 104 may be used between the telecommunications network 102 and the mobile station 106 to switch a particular call to the particular mobile station 106.

In one embodiment, the telecommunications network 102 may include the mobile station 106 associated with the telecommunications network 102. The switching module 104 of the telecommunications network 102 may establish a call between a communication device 100A-N and the mobile station 106. The call termination module 310 of FIG. 3 of the mobile station 106 may determine if the mobile station 106 is in a call termination mode and may also communicate a communication protocol to the switching module 104 to cause the switching module 104 to terminate the call if the mobile station 106 is in the call termination mode. The message module 314 of FIG. 3 of the telecommunications network 102 may communicate a message to the communication device 100A-N.

The switching module (e.g., MSC) 104 may a mobile switching center (MSC) that may be a service delivery node for a global system for mobile communications (GSM). The communication protocol may be an ISDN User Part (ISUP) protocol which may be used to establish the call on the circuit switching network (e.g. establishes a fixed bandwidth circuit between a node and a terminal). The mobile station may match a calling party with a specified calling list. The telecommunications network (e.g., circuit switching network, GSM network) 102 may be a circuit switching network that may establish a fixed bandwidth telecommunications circuit between a node and a terminal. The circuit switching network may establish a fixed bandwidth circuit and/or channel between a set of nodes and a set of terminals.

The switching module (e.g., MSC) 104 may be a mobile switching center (MSC) that may be a service delivery node for a global system for mobile communications (GSM). An MSC may handle a voice call and/or a short message service (SMS) as well as other services (e.g., conference call, FAX and circuit switched data). The MSC may sets up and release the end-to-end connection, handle mobility and hand-over requirements during the call. The MSC may manage charging and real time pre-paid account monitoring. The communication protocol may be an ISDN User Part (ISUP) protocol used to set up the call on the circuit switching network.

Figure 2:
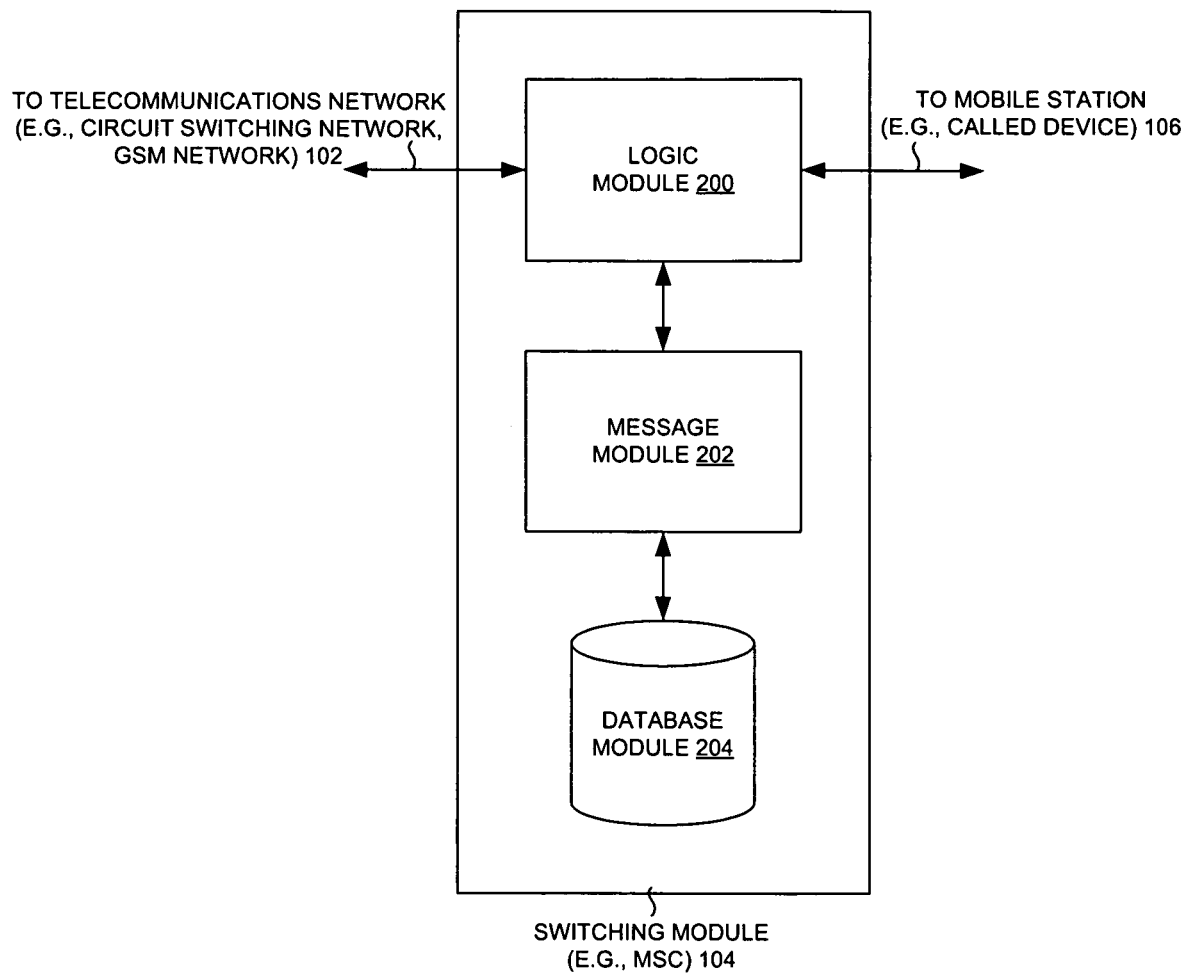
FIG. 2 is an exploded view of a switching module, according to one embodiment.

FIG. 2 is an exploded view of a switching module, according to one embodiment. Particularly, FIG. 2 illustrates a logic module 200, a message module 202, a database module 204, the telecommunications network (e.g., the circuit switching network, the GSM network) 102, the switching module (e.g., the MSC) 104, and the mobile station (e.g., called device) 106, according to one embodiment.

The logic module 200 may be configured to the switching module (e.g., the MSC) 104 to communicate a generic message to the calling device when an unspecified message has been associated with the calling device. The generic message may be a message pertaining to an entire class of callers and not particular to a specific caller. It may be user generated and/or a system default message. The message module 202 may generate a content of the message, store the message in the database module and also associate the message with the communication device (e.g., the calling device) 100A-N. The database module 204 may be a collection of information and/or data that is organized usually for referencing (e.g., a group of names, the addresses, the phone numbers, etc.)

In example embodiment, the switching module (e.g., the MSC) 104 may include the logic module 200, the message module 202 and/or the database module 204. The switching module (e.g., the MSC) 104 may communicate with the telecommunications network (e.g., the circuit switching network, the GSM network) 102 and the mobile station (e.g., called device) 106.

In one embodiment, the message module 202 may communicate a message to the communication device (e.g., calling device) 100A-N. The database module 204 of the switching module (e.g., MSC) 104 may store the message. The message module 202 may generate a content of the message, store the message in the database module 204 and associates the message with the communication device (e.g., calling device) 100A-N. The message may be communicated (e.g., a message module 202 of FIG. 2) to a calling device (e.g., the communication device 100A-N of FIG. 1) after termination of the call. The specified message may be communicated (e.g., a message module 202 of FIG. 2) to the communication device (e.g., calling device) 100A-N. The specified message and the generic message may be stored (e.g., using the database module 204 of FIG. 2) in a database of the switching module (e.g., MSC) 104. The specified message may be a user specified message and/or a generic message.

The logic module 200 of the MSC may be configured to communicate a message to a calling device (e.g., the communication device 100A-N of FIG. 1) that originated the call. The database module (e.g., the database module 204 of FIG. 2) of the MSC may be configured to store the message.

Figure 3:
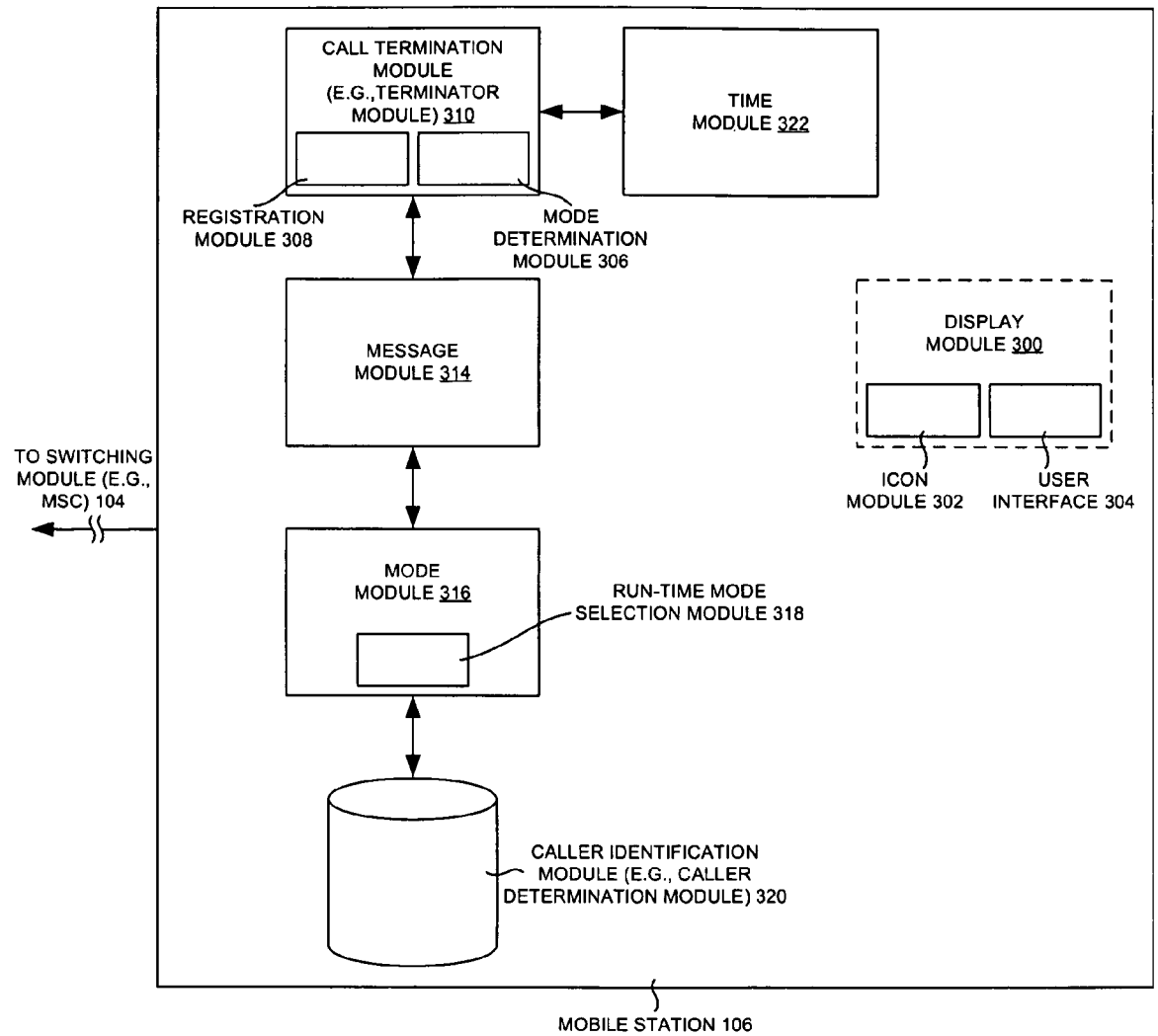
FIG. 3 is an exploded view of the mobile station, according to one embodiment.

FIG. 3 is an exploded view of the mobile station, according to one embodiment. Particularly, FIG. 3 illustrates a display module 300, a icon module 302, a user interface 304, a mode determination module 306, a registration module 308, a call termination module 310, a message module 314, a mode module 316, a run-time mode selection module 318, a caller identification module 320, the switching module 104, and the mobile station 106, according to one embodiment.

The display module 300 may be an electronic device that represents information in visual form and may render visual and/or tactile information. The icon module 302 may be a graphic symbol displayed on the screen, which when selected may work in a particular function. The user interface 304 may be included in the display module 300 of the mobile station 106 to indicate that the mobile station 106 is receiving the call from the communication device 100A-N. The mode determination module 306 of the call termination module 310 may determine whether mobile station 106 is in the call termination mode.

The registration module 308 of the call termination module 310 may determine whether the mobile station 106 is registered with a call termination service and to permit the call termination module to terminate the call if the mobile station is registered with the call termination service.

The call termination module 310 of the mobile station 106 may determine whether the mobile station is in a call termination mode and may also communicate a communication protocol to the switching module 104 to cause the switching module to terminate the call if the call is in the call termination mode. The calling device may be ISDN User Part and/or ISUP which is a part of the Signaling System 7 protocol which is used to set up telephone calls in Public Switched Telephone Networks. The ISUP may be specified by the ITU-T. The message module 314 in the mobile station 106 may communicate a message to the communication device 100A-N.

The mode module 316 of the mobile station 106 may enable the mobile station 106 to be placed in the call termination mode. The run-time mode selection module 318 may allow the mobile station 106 to be placed in the call termination mode in run-time. For example, when receiving a call, the user may select call termination mode instead of answer the call.

The caller identification module 320 may associate a particular calling device with a specified message and may cause the specified message to be communicated to the calling device (e.g., the communication device 100A-N). The caller identification module may cause the logic module 200 to communicate a generic message to the calling device (e.g., the communication device 100A-N) when there is an unspecified message associated with the calling device (e.g., the communication device 100A-N).

In an example embodiment, the mobile station 106 may include the display module 300, the icon module 302, the user interface 304, the mode determination module 306, the registration module 308, the call termination module 310, the message module 314, the mode module 316, the run-time mode selection module 318, and the caller identification module 320. The display module 300 may include the icon module 302 and the user interface 304. The call termination module (e.g., the terminator module) 310 may include the mode determination module 306 and the registration module 308. The modules in the mobile station 106 may communicate with each other. The mobile station 106 may communicate with the switching module (e.g., the MSC) 104.

In one embodiment, the call termination module 310 of the mobile station 106 may determine if the mobile station 106 is in a call termination mode and may also communicate a communication protocol to the switching module (e.g., MSC) 104 that may cause the switching module 104 to terminate the call if the call is in the call termination mode. The mode module 316 may enable the mobile station 106 to be placed in the call termination mode. For example, the ISUP protocol may be a release ISUP message with a specified code parameter communicated by the call termination module to the MSC. The implementation of the specified code parameter may include a modification of the 3GPP Technical Specification 9.12 (e.g., the ITU-T Q.76x series specification) in order to accommodate a set of changes in the MSC/network side. The modification of the ITU-T Q.76x series specification may create a provision for selecting a 'Release Cause' that will result in playing an audio message configured by user. A software logic change may be applied in the Mobile Handset and/or the MSC/network side which in order to implement the modification of the ITU-T Q.76x series specification.

The registration module 308 of the call termination module 310 may determine if the mobile station 106 may be registered with a call termination service and may permit the call termination module 310 to terminate the call if the mobile station 106 is registered with the call termination service. The mode module 316 may contain a run-time module that may allow the mobile station 106 to be placed in the call termination mode in run-time. The mode determination module 306 of the call termination module 310 may determine if the mobile station 106 is in the call termination mode. The display module 300 may render an indicator icon on a user interface of the mobile station 106 to indicate that the mobile station 106 is receiving the call from the communication device 100A-N.

The time module 322 may terminate the call after a specified period of time has elapsed from the when time the call is received by the mobile station (e.g., called device) 106. The time module may be located in the mobile station (e.g., called device) 106 and/or the switching module (e.g., MSC) 104. The call termination module (e.g., termination module) 310 may be in the switching module (e.g., MSC) 104. The specified code parameter may be a release (REL) message. The call may be terminated by performing a haptic gesture on the user interface 304 of the mobile station (e.g., called device) 106 and inputting an alphanumeric code into the mobile station (e.g., called device) 106. The haptic gesture may include a gesture and/or contact with a mobile device a the sense of touch of a user applying a force, vibration and/or motion to the mobile device. The call may be terminated (e.g., using a call termination module 310 of FIG. 3). The identity of the communication device (e.g., calling device) 100A-N may be determined (e.g., using the caller identification module 320 of FIG. 3). If the call may be from a unspecified communication device (e.g., calling device) 100A-N that may not been associated with a list of calling devices (e.g. communication devices) which may be associated with specified message may be determined (e.g., using the caller identification module 320 of FIG. 3). The generic message may be communicated (e.g., using the message module 314 of FIG. 3) to an unspecified mobile station (e.g., called device) 106.

The mobile station (e.g., called device) 106 may be placed (e.g., the mode module 316 of FIG. 3) in the call termination mode on a run-time basis after the call has been received. The mobile station (e.g., called device) 106 may be determined (e.g., using the registration module 308 of FIG. 3) if registered with a call termination service and may be communicated of the specified message and the generic message only if the mobile station (e.g., called device) 106 is registered with the call termination service. The indicator icon may be displayed (e.g., using the display module 300 of FIG. 3) on a user interface (e.g., the user interface of FIG. 3) 304 of the mobile station (e.g., called device) 106 when the call is received. The indicator icon may indicate the identity of the communication device (e.g., calling device) 100A-N. The indicator icon may be an interface pictogram displayed on the user interface 304.

The call may be terminated (e.g., using the call termination module 310 of FIG. 3) by performing a haptic gesture on the user interface 304 of the mobile station (e.g., called device) 106 and inputting an alphanumeric code into the mobile station (e.g., called device) 106. The call may be terminated (e.g., using a time module 322) after a specified period of time when the call is in an unanswered state. The specified time may be provided for the call to be in the unanswered state before it is terminated. The terminator module of a called device may be configured to terminate a call. The mobile station 106 (e.g., the called device) may be configured to communicate a specified communication protocol to a logic module (e.g., the logic module 200 of FIG. 2) of a mobile switching center (MSC) after the call has been terminated by the terminator module.

The caller identification module (e.g., the caller identification module (e.g., caller determination module) 320 of FIG. 3) may be configured to associate a particular communication device (e.g., calling device) 100A-N with a specified message and to cause the specified message to be communicated to the communication device (e.g., calling device) 100A-N. The caller identification module (e.g., caller determination module) 320 may cause the logic module 200 to communicate a generic message to the communication device (e.g., calling device) 100A-N if no specified message has been associated with the communication device (e.g., calling device) 100A-N. The specified communication protocol may be an ISUP protocol.

Figure 4A:
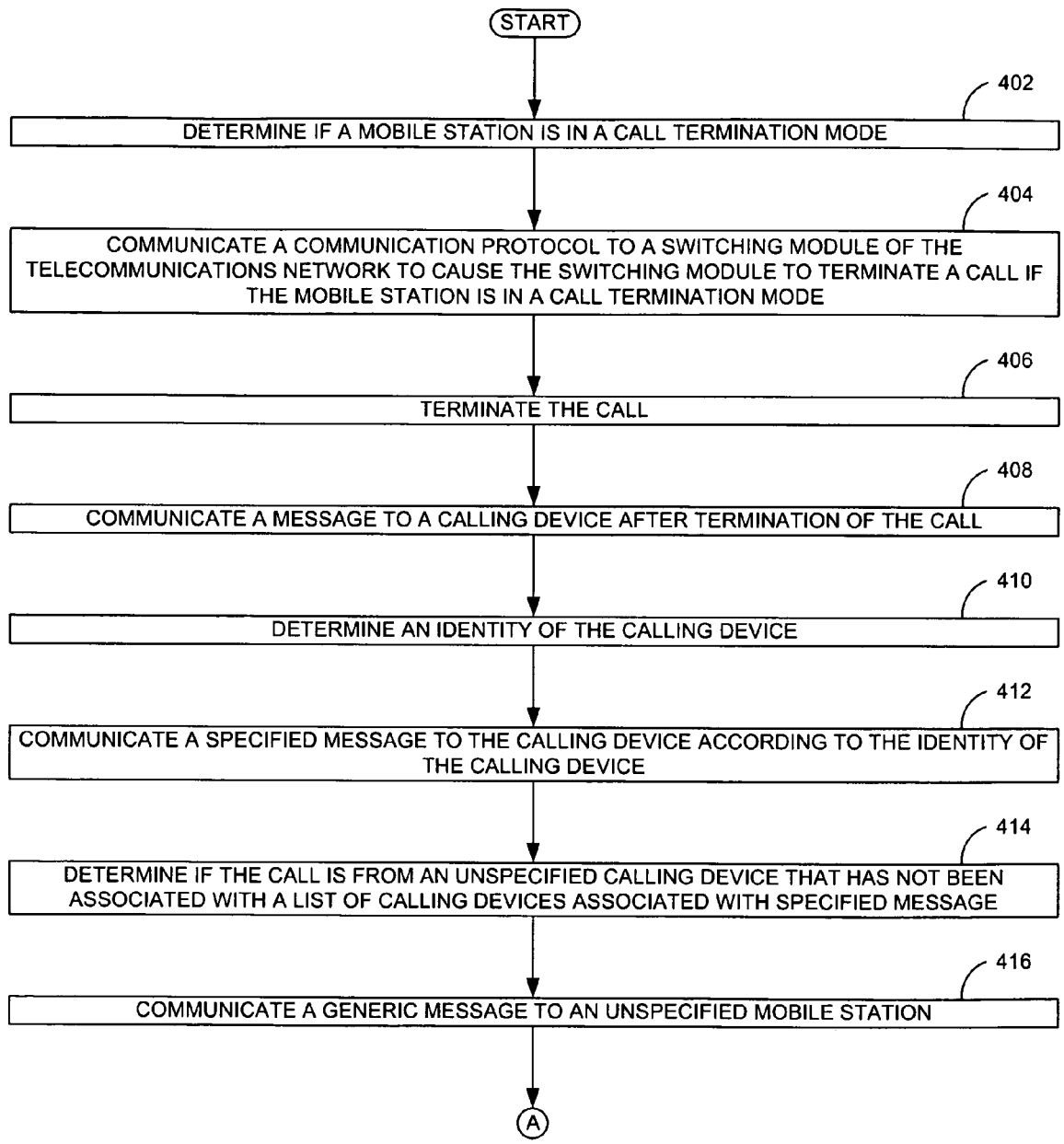
FIG. 4A is a process flow of the mobile station illustrating reception of a call sent through the telecommunications network and communicating a generic message to an unspecified mobile station, according to one embodiment.

FIG. 4A is a process flow of the mobile station illustrating reception of a call sent through the telecommunications network and communicating a generic message to an unspecified mobile station, according to one embodiment.

In operation 402, a mobile station 106 may be determined by the telecommunications network 102 whether is in a call termination mode. In operation 404, a communication protocol may be communicated to a switching module (e.g., the switching module 104 of FIG. 1) of the telecommunications network 102 to cause the switching module 104 to terminate a call if the mobile station 106 is in a call termination mode.

In operation 406, the call may be terminated. In operation 408, a message may be communicated to a calling device after the termination of the call.

In operation 410, an identity of the communication device (e.g., calling device) 100A-N may be determined (e.g., using the caller identification module 320 of FIG. 3). In operation 412, a specified message may be communicated (e.g., a message module 202 of FIG. 2) to the calling device according to the identity of the calling device (e.g., calling device) 100A-N. In operation 414, if the call is from a unspecified communication device (e.g., calling device) 100A-N that may not been associated with a list of calling devices which may be associated with specified message may be determined (e.g., using the caller identification module 320 of FIG. 3). In operation 416, a generic message may be communicated (e.g., using the message module 314 of FIG. 3) to an unspecified mobile station (e.g., called device) 106. The specified message and the generic message may be stored (e.g., using the database module 204 of FIG. 2) in a database of the switching module (e.g., MSC) 104.

Figure 4B:
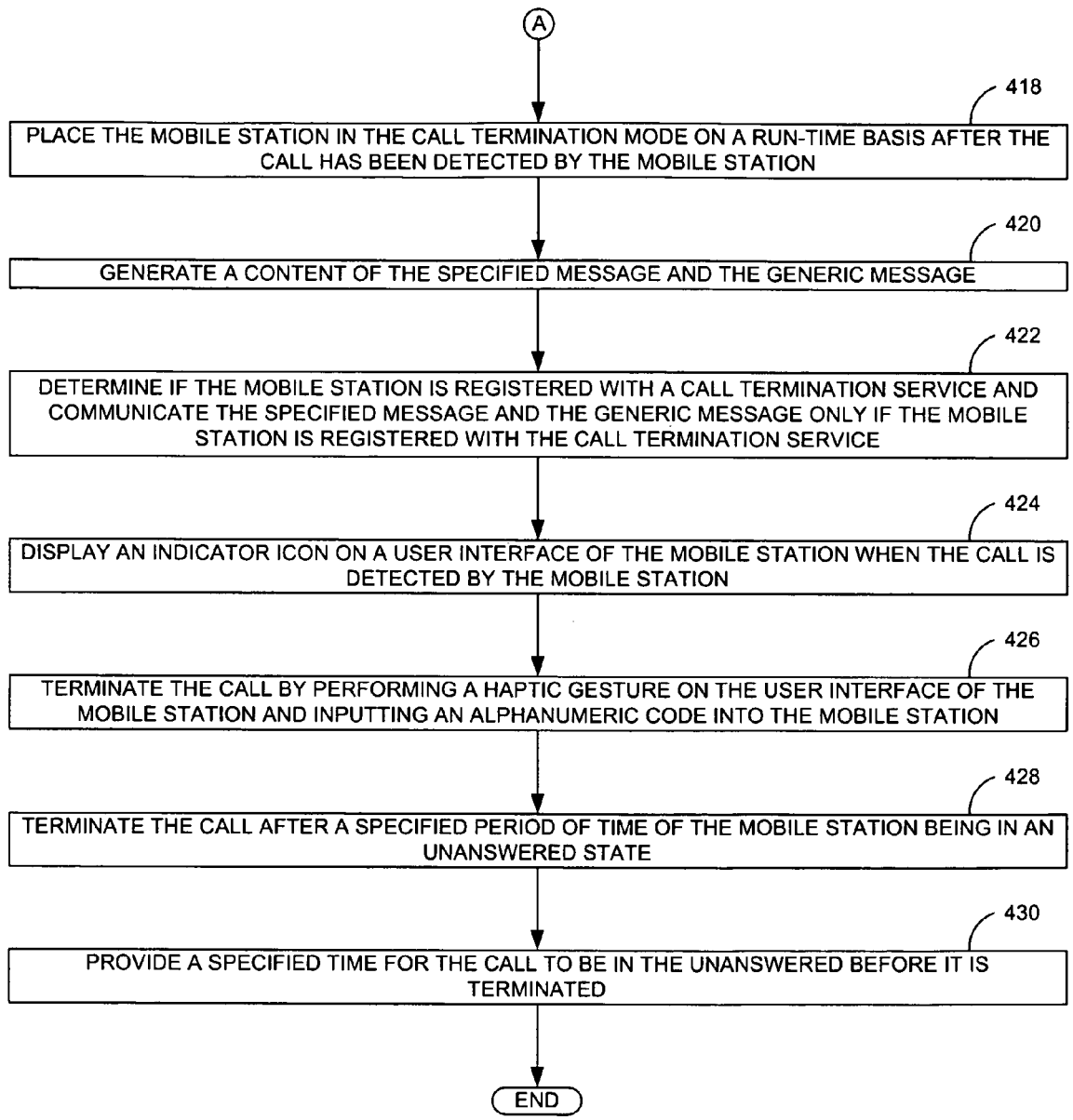
FIG. 4B is a continuation of process flow of FIG. 4A illustrating additional operations, according to one embodiment.

FIG. 4B is a continuation of process flow of FIG. 4A illustrating additional operations, according to one embodiment.

In operation 418, the mobile station (e.g., called device) 106 may be placed (e.g., the mode module 316 of FIG. 3) in the call termination mode on a run-time basis after the call has been detected by the mobile station 106. The telecommunications network 102 (e.g., circuit switching network, GSM network) may be a circuit switching network that may establish a fixed bandwidth telecommunications circuit between a node and a terminal. In operation 420, a content of the specified message and the generic message may be generated (e.g., using the message module 314 of FIG. 3). The switching module (e.g., MSC) 104 may be a mobile switching center (MSC) that may be a service delivery node for a global system for mobile communications (GSM). The communication protocol may be an ISDN User Part (ISUP) protocol used to set up the call on the circuit switching network.

In operation 422, the mobile station (e.g., called device) 106 may be determined (e.g., using the registration module 308 of FIG. 3) if registered with a call termination service and may be communicated of the specified message and the generic message only if the mobile station (e.g., called device) 106 is registered with the call termination service. In operation 424, an indicator icon may be displayed (e.g., using the display module 300 of FIG. 3) on a user interface (e.g., the user interface of FIG. 3) of the mobile station (e.g., called device) 106 when the call is detected by the mobile station 106. The indicator icon may indicate the identity of the communication device (e.g., calling device) 100A-N.

In operation 426, the call may be terminated (e.g., using the call termination module 310 of FIG. 3) by performing a haptic gesture on the user interface 304 of the mobile station (e.g., called device) 106 and inputting an alphanumeric code into the mobile station (e.g., called device) 106. In operation 428, the call may be terminated (e.g., using a time module 322) after a specified period of time when the call is in an unanswered state. In operation 430, a specified time may be provided for the call to be in the unanswered state before it is terminated.

Figure 5:
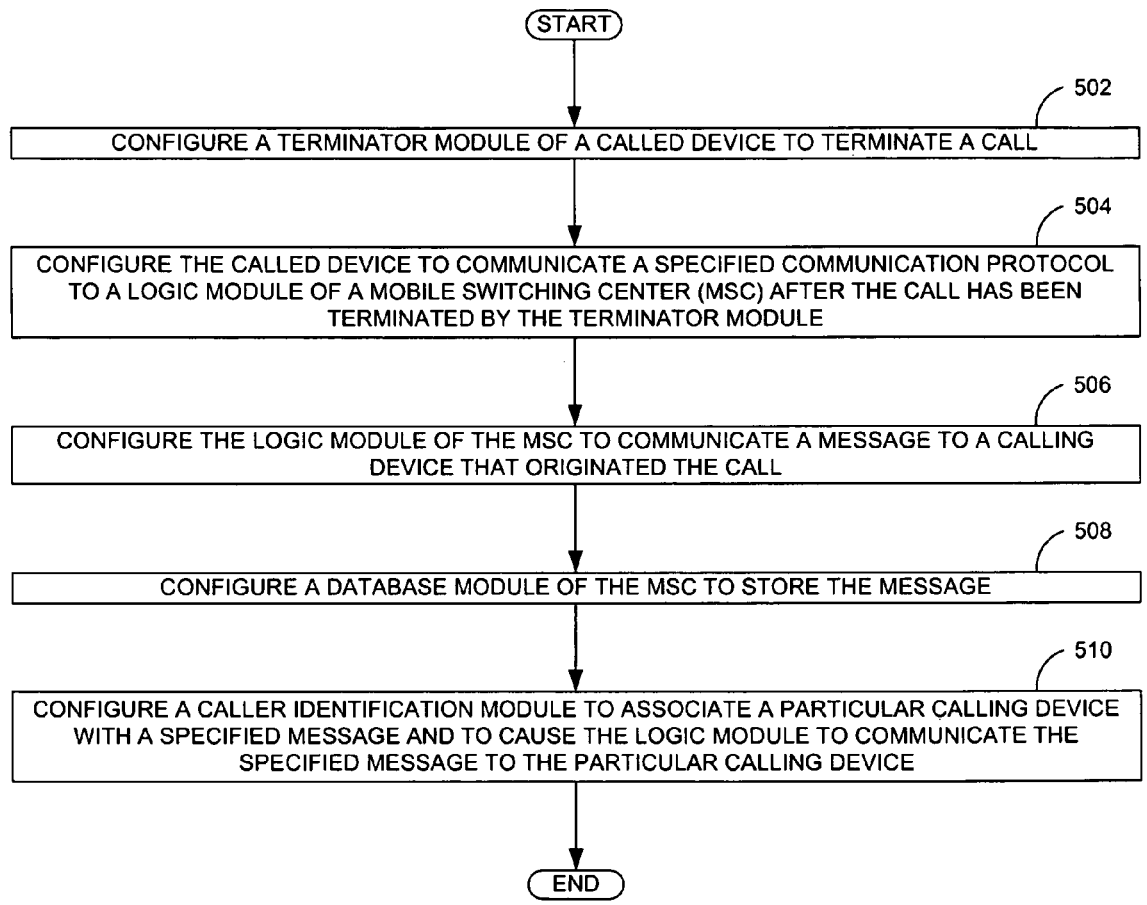
FIG. 5 is a process flow illustrating the configuration of various modules to a called device and/or a calling device, according to one embodiment.

FIG. 5 is a process flow illustrating the configuration of various modules to a called device and/or a calling device, according to one embodiment.

In operation 502, a terminator module of a called device may be configured to terminate a call. In operation 504, the called device may be configured to communicate a specified communication protocol to a logic module (e.g., the logic module 200 of FIG. 2) of a mobile switching center (MSC) after the call has been terminated by the terminator module 310.

In operation 506, the logic module 200 of the MSC may be configured to communicate a message to a calling device (e.g., the communication device 100A-N of FIG. 1) that originated the call. In operation 508, a database module (e.g., the database module 204 of FIG. 2) of the MSC may be configured to store the message. In operation 510, a caller identification module (e.g., the caller identification module (e.g., caller determination module) 320 of FIG. 3) may be configured to associate a particular communication device 100A-N with a specified message and to cause the logic module 200 to be communicate the specified message to the particular calling device 100A-N.

The caller identification module (e.g., caller determination module) 320 may cause the logic module 200 to communicate a generic message to the communication device (e.g., calling device) 100A-N if no specified message has been associated with the communication device (e.g., calling device) 100A-N. The specified communication protocol may be an ISUP protocol.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the switching module 104 of FIG. 1, the logic module 200, the message module 202, the database module 204 of FIG. 2, and the display module 300, the icon module 302, the user interface 304, the mode determination module 306, the registration module 308, the call termination module 310, the message module 314, the mode module 316, the run-time mode selection module 318, the caller identification module 320 of FIG. 3 may be enabled using a switching module, a logic circuit, a message circuit, a database circuit, a display circuit, a icon circuit, a user interface, a mode determination circuit, a registration circuit, a call termination circuit, a ISUP circuit, a message circuit, a mode circuit, a run-time mode selection circuit, a caller identification circuit and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system of a telecommunications network comprising:
a mobile station associated with a user of the telecommunications network;
a switching module of the telecommunications network to establish a call between a communication device and the mobile station;
a call termination module of the mobile station to determine if the mobile station is in a call termination mode and to communicate a communication protocol to the switching module to cause the switching module to terminate the call if the mobile station is in the call termination mode;
a message module associated with the switching module, the message module communicating an appropriate message on behalf of the user to the communication device upon termination of the call by the user prior to a connection being established between the communication device and the mobile station, and the appropriate message on behalf of the user indicating a status of the user responsible for the termination of the call; and
a database module of the switching module to store the appropriate message to be delivered to the communication device upon the termination of the call by the user.

2. The system of claim 1, further comprising:
a mode module of the mobile station to enable the mobile station to be placed in the call termination mode.

3. The system of claim 2, wherein at least one of:
the message module is configured to generate a content of the appropriate message and associate the appropriate message with the communication device, and
the communication protocol is an ISDN User Part (ISUP) protocol used to establish the call on a circuit switching network.

4. The system of claim 3,
wherein the ISUP protocol is a release ISUP message with a specified code parameter communicated by the call termination module to the switching module, and
wherein the message is at least one of an audio message and a text message.

5. The system of claim 2, further comprising:
a registration module of the call termination module to determine if the mobile station is registered with a call termination service and to permit the call termination module to terminate the call if the mobile station is registered with the call termination service,
wherein the mode module includes a run-time module to place the mobile station in the call termination mode in run-time; and
a mode determination module of the call termination module to determine if the mobile station is in the call termination mode.

6. The system of claim 1, further comprising a display module of the mobile station to render an indicator icon on a user interface of the mobile station to indicate that the mobile station is receiving the call from the communication device.

7. The system of claim 6,
wherein the call is terminated by performing at least one of a haptic gesture on the user interface of the mobile station and inputting an alphanumeric code into the mobile station, and
wherein the specified code parameter is a release (REL) message.

8. The system of claim 1, further comprising:
a time module to terminate the call after a specified period of time has elapsed from when the call is received by the mobile station,
wherein the call termination module is in the switching module.

9. A method of a telecommunications network comprising:
determining if a mobile station associated with a user of the telecommunications network is in a call termination mode;
communicating a communication protocol to a switching module of the telecommunications network to cause the switching module to terminate a call from a communication device to the mobile station if the mobile station is in the call termination mode;

communicating, through the switching module, an appropriate message on behalf of the user to the communication device upon termination of the call by the user prior to a connection being established between the communication device and the mobile station, the appropriate message on behalf of the user indicating a status of the user responsible for the termination of the call; and storing, in the switching module, the appropriate message to be delivered to the communication device upon the termination of the call by the user.

10. The method of claim 9, further comprising:

determining an identity of the communication device; and communicating the appropriate message to the communication device, in accordance with the identity of the communication device.

11. The method of claim 9, further comprising:

determining if the call is from a unspecified communication device that is not associated with a list of communication devices associated with at least one appropriate message; and communicating a generic message to an unspecified mobile station, wherein the appropriate message and the generic message are stored in a database of the switching module.

12. The method of claim 9, further comprising placing the mobile station in the call termination mode on a run-time basis after the call has been detected by the mobile station.

13. The method of claim 11, further comprising:

generating a content of at least one of the appropriate message and the generic message, wherein at least one of: the switching module is a mobile switching center (MSC) that is a service delivery node for a global system for mobile communications (GSM), and the communication protocol is an ISUP protocol used to set up the call on a circuit switching network.

14. The method of claim 11, further comprising determining if the mobile station is registered with a call termination service and communicating at least one of the appropriate message and the generic message only if the mobile station is registered with the call termination service.

15. The method of claim 9, further comprising:

displaying an indicator icon on a user interface of the mobile station when the call is detected by the mobile station, wherein the indicator icon indicates the identity of the communication device.

16. The method of claim 15, further comprising terminating the call by performing at least one of a haptic gesture on the user interface of the mobile station and inputting an alphanumeric code into the mobile station.

17. The method of claim 16, further comprising:

terminating the call after a specified period of time of the mobile station being in an unanswered state; and providing a specified time for the call to be in the unanswered state before the termination thereof.

18. The method of claim 13, wherein the ISUP protocol is a release ISUP message with a specified code parameter communicated by the call termination module to the switching module, and wherein the message is at least one of an audio message and a text message.

19. A method of a telecommunications network comprising:

configuring a termination module of a called device of a user of the telecommunications network to terminate a call;

configuring the called device to communicate a specified communication protocol to a logic module of a mobile switching center (MSC) after the call has been terminated by the termination module;

configuring a logic module of the MSC to communicate an appropriate message on behalf of the user of the called device to a calling device that originated the call upon the termination of the call by the user prior to a connection being established between the calling device and the called device, the appropriate message on behalf of the user indicating a status of the user responsible for the termination of the call; and storing, in a database module of the MSC, the appropriate message to be delivered to the calling device upon the termination of the call by the user.

20. The method of claim 19, further comprising:

configuring a database module of the MSC to store the appropriate message; and configuring a caller identification module to associate a particular calling device with a specified message and to cause the logic module to communicate the specified message to the particular calling device, wherein the caller identification module causes the logic module to communicate a generic message to the calling device if no specified message is associated with the calling device.

* * * * *